INVENTOR.
H.S. WYNN

Oct. 5, 1965   H. S. WYNN   3,209,865
CAR RETARDING SYSTEM
Filed Jan. 22, 1962   4 Sheets-Sheet 2

UNIT U3

INVENTOR.
H.S. WYNN
BY Forest B. Hitchcock
HIS ATTORNEY

Oct. 5, 1965  H. S. WYNN  3,209,865
CAR RETARDING SYSTEM
Filed Jan. 22, 1962  4 Sheets-Sheet 3
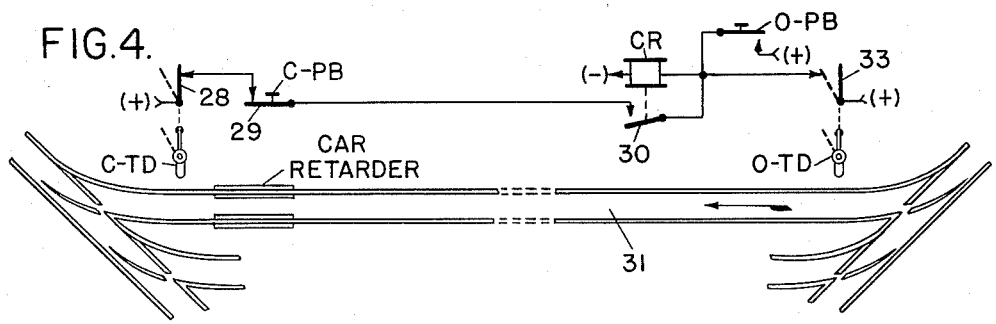
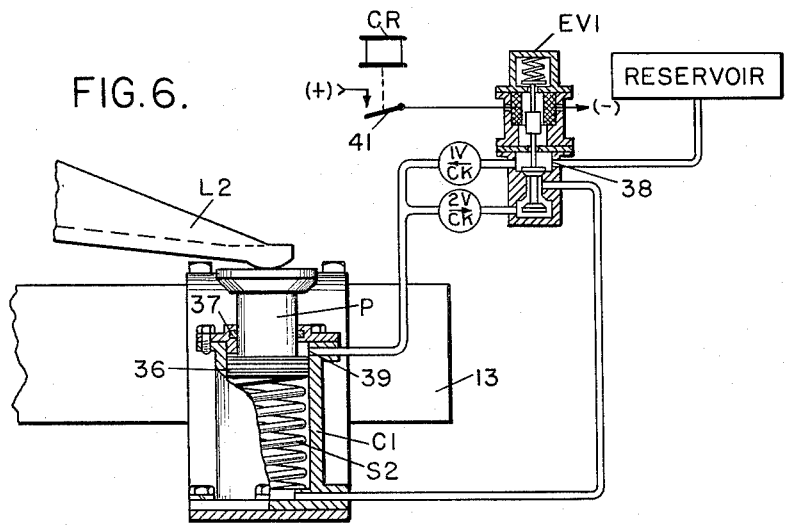
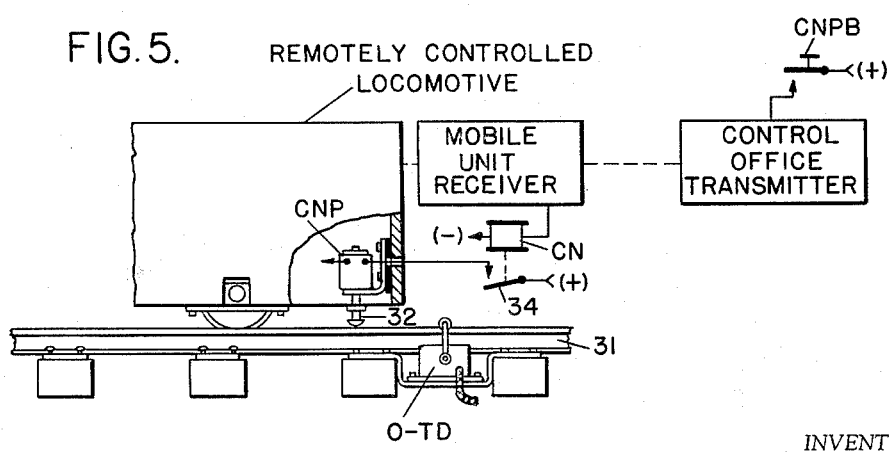
INVENTOR.
H.S. WYNN
BY Forest B. Hitchcock
HIS ATTORNEY INVENTOR.
H. S. WYNN
BY
*Forest B. Hitchcock*
HIS ATTORNEY

United States Patent Office 3,209,865
Patented Oct. 5, 1965

3,209,865
CAR RETARDING SYSTEM
Harold S. Wynn, Pittsford, N.Y., assignor to General Signal Corporation, a corporation of New York
Filed Jan. 22, 1962, Ser. No. 168,587
10 Claims. (Cl. 188—62)

This application is a continuation-in-part of prior application Serial No. 692,452, filed Oct. 25, 1957, now abandoned.

The present invention relates to a system for selectively retarding railway cars employing a car retarder of the track brake type, and it more particularly pertains to such a system wherein the car retarder is self-powered in operating to selected braking and non-braking positions, utilizing the weight of a car and spring pressure in the actuation of its mechanism.

There are conditions in railway classification yards where it is desirable to use a car retarder such, for example, as an inert car retarder, to stop and hold a car for an indefinite length of time. An inert car retarder may be defined as a car retarder in which braking pressure is applied by the weight of a car. One condition where an inert car retarder is desirable is where a rail skate is commonly used to stop and hold the first car that is put into a classification track from the hump. Such a car retarder holds the first car in the classification track as would be accomplished by a rail skate to prevent the car from entering the switching area at the exit end of the classification tracks.

Where a car retarder is used in place of a rail skate under the above conditions, it is desirable to be able to control the car retarder to an open position for moving cars out of the classification tracks, as may be accomplished by a locomotive which may be either manually or remotely controlled. It is further desirable to be able to close the retarder immediately after cars have been moved through it so as to have it conditioned to stop and hold the next car to enter the classification track from the hump.

Generally speaking, and without attempting to define the scope of the present invention, the present invention provides a braking system to satisfy the above requisites without the use of external power for operating the car retarder such as an electric motor or compressed fluid. The power for opening the car retarder is furnished by the weight of a car, and the power for closing the retarder is furnished by restoration springs of a size heavy enough to lift the retarder at particular support points to operate the retarder to a braking position when no car is present within the retarder. These springs are light enough, however, to be compressed by the weight of a car within the retarder, when rendered effective to operate the retarder to a non-braking position.

The times at which the car retarder may be operated to designated braking and non-braking positions respectively are governed by hydraulic locking means including an electrohydraulic valve. This valve controls the flow of fluid selectively into and out of a cylinder beneath a piston supporting a part of the car retarder for the purpose of selectively hydraulically locking the car retarder in its last actuated position until actuation of the electrohydraulic valve in accordance with the designation of the opposite position for the retarder. Fluid is not required to be applied to the valve under pressure other than pressure provided by the weight of a car on the retarder. The hydraulic system is used as a locking means to lock the car retarder in a designated braking or non-braking position, rather than as a means for operating the retarder between braking and non-braking positions.

The hydraulic locking means in one form of the invention also provides control of the rate of operation of the car retarder from its braking position to its non-braking position such that operation is relatively rapid up to a point immediately approaching the non-braking position, at which point the flow of fluid is additionally restricted to cushion the dropping of the retarder into its non-braking position. Provision is also made by the locking means for opening the brake shoes of the retarder more fully as wider car wheels pass through the retarder when the retarder is locked in its non-braking position.

It is further provided that the actuation of the electrohydraulic valve is automatic under different conditions such as, for example, being automatically actuated to operate a retarder to its non-braking position upon the entrance of a locomotive into a classification track to permit the locomotive to push cars through the car retarder. Upon the locomotive leaving the car retarder, the car retarder is automatically restored to its braking position so as to be conditioned to stop the next car to enter that track from the hump.

An object of the present invention is to provide a car retarder that is spring biased to a braking position and is operated to a non-braking position by the weight of a car.

Another object of the present invention is to provide hydraulic means separate from operating means for locking a car retarder selectively in its braking and non-braking position.

Another object of the present invention is to selectively render effective operation of an inert car retarder by spring pressure in accordance with the actuation of an electrohydraulic valve.

Another object of the present invention is to provide for the operation of a car retarder of the inert type relatively rapidly from its braking position to a predetermined point just prior to reaching its non-braking position, and to reduce the rate of operation at the predetermined point to cushion the dropping of the retarder into its non-braking position.

Another object of the present invention is to lock the car retarder in its non-braking position, but yet permit it to be opened further as relatively wider car wheels pass through the retarder.

Another object of the present invention is to provide hydraulic locking means to selectively render the operation of the car retarder effective, such hydraulic locking means including a fluid circulating system for circulating fluid between opposite ends of a cylinder wherein a single normally closed two-way valve is provided which is opened for operation of the car retarder to either its braking position or its non-braking position.

Another object of the present invention is to automatically govern the operation of an inert car retarder to operate the car retarder to a non-braking or open position when cars are being pushed through it and to operate the car retarder to a braking or closed position when it has become vacated.

Other objects, purposes and characteristic features of the present invention will be in part obvious from the accompanying drawings and in part pointed out as the description of the invention progresses.

In describing the invention in detail, reference is made to the accompanying drawings in which similar reference characters are used to identify corresponding parts in the several views, and in which:

FIG. 4 illustrates schematically a system of electrical control for governing the operation of the car retarder;

FIG. 5 illustrates schematically the manner in which a treadle along the trackway is subject to actuation by a locomotive;

FIG. 6 illustrates a modified form of hydraulic locking for the car retarder;

The car retarder to which the control mechanism provided by the present invention may be applied may be of any suitable type, but for the embodiment of the invention herein disclosed, it is assumed that the control mechanism is applied to an inert car retarder constructed substantially as is disclosed in the U.S. patent application of N. C. L. Brown, Ser. No. 534,750, filed Sept. 16, 1955 now Patent No. 2,858,907, granted Nov. 4, 1958. Inasmuch as reference can be made to this application for a detailed description of the car retarder, it is considered sufficient for an understanding of the present invention to consider only the general car retarder structure.

Figure 1:
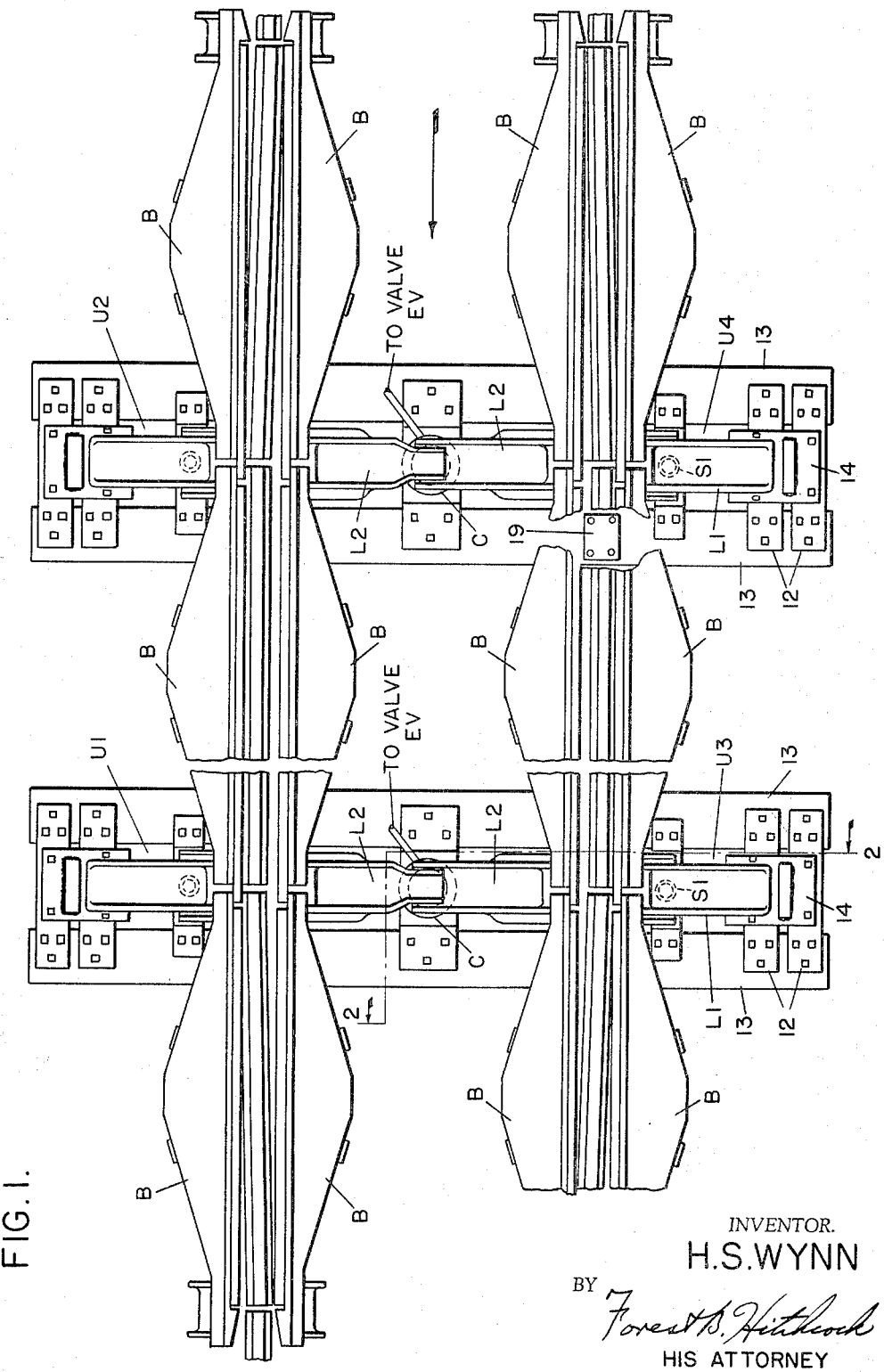
FIG. 1 is a plan view of an inert car retarder constructed according to one embodiment of the present invention.

With reference to FIG. 1, the car retarder structure is illustrated as comprising a succession of brake beams B disposed end to end in a stretch of track both inside and outside of the track rails and positioned slightly above the track rails so as to be operable to apply brake pressure through associated brake shoes to both sides of the rims of the wheels of cars passing through the retarder. These beams B are supported at their ends by actuating units U except at the ends of the retarder where they are rigidly supported and their shoes are flanged for receiving the wheels of cars entering the retarder. It is to be understood, however, that continuous track rails can be used for brake shoes in accordance with the requirements of practice.

Figure 2:
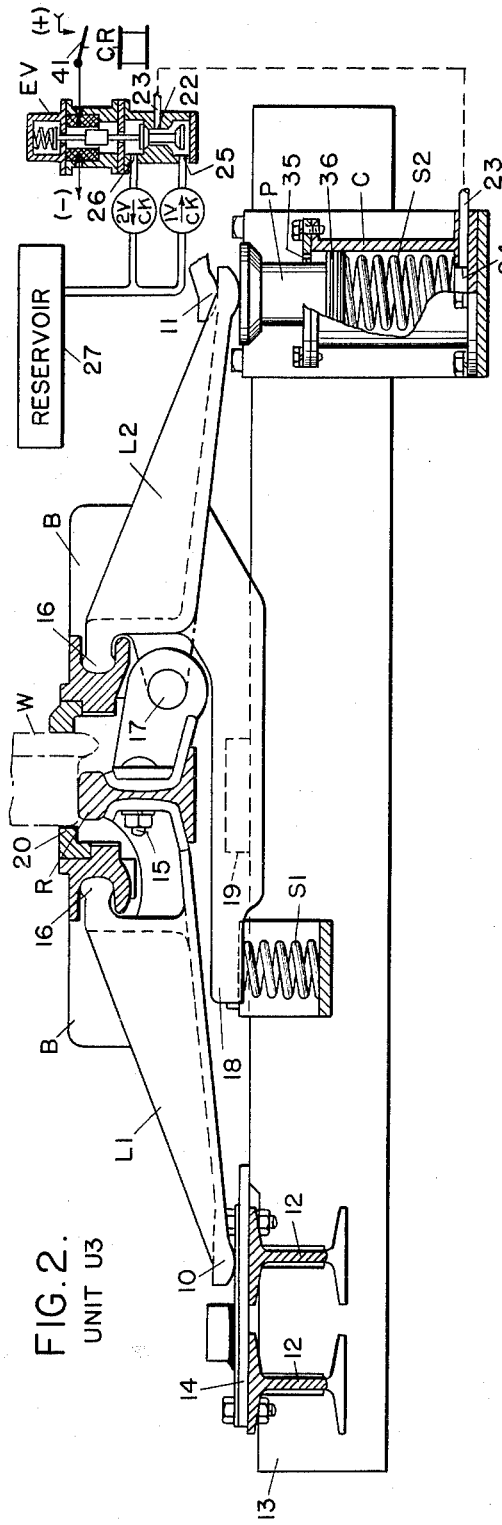
FIG. 2 is an elevational sectional view of a typical actuating unit of the car retarder taken along the line 2—2 of FIG. 1 showing the car retarder in its closed position when applying braking pressure to a car wheel.

With reference to FIG. 2, a typical actuating unit is illustrated in its braking or closed position applying braking pressure to a car wheel W. This operating unit comprises levers L1 and L2 secured to the opposite sides of a rail section R and disposed in opposition to each other wherein the opposite ends of the levers L1 and L2 have hardened bearing surfaces 10 and 11 respectively resting on support points laterally spaced from the rail section R and effective to support the weight applied to the rail R by the wheel W. The point 10 rests on a suitable supporting channel 12 bridged between the outside ends of two railway ties 13, there being a suitable hardened plate 14 secured to the top of the channel 12 so that the bearing surface 10 is in direct contact with this plate.

The inside ends of the levers L1 and L2 are suitably secured to the rail section R as by bolts 15, each of the levers L1 and L2 having a suitable nub 16 formed in its upper inside surface for cooperating with the adjoining ends of brake beam B for supporting and actuating the associated brake beams. Each of the levers L2 is articulated in that it is journaled for elevational movement by a journal pin 17 that is disposed below the nub 16 and thus provides a pivot point about which the lever L2 may be rotated to apply pressure to the car wheel W.

The dead weight of the car retarder is supported in each car retarder unit by springs S1 and S2. The spring S1 is a compression spring disposed beneath an extension arm 18 which is integral with the lever L2 and extends beneath the rail section R.

The spring S2 is a compression spring that is disposed in a cylinder C and beneath a piston P which in turn bears the weight applied by the lever L2 to its bearing surface 11. This spring S2 is heavy enough to a little more than support the weight of the car retarder that is applied to the bearing surface 11 with no car present, but the spring S2 is light enough to be compressed by the additional weight applied by a car wheel upon passage of a car through the car retarder, provided a control for opening the car retarder has been designated.

The spring S2, piston P and cylinder C assembly is so disposed beneath the bearing point 11 of the lever L2 that the piston P, when fully extended upwardly from the cylinder C raises the actuating lever L2 to a point where the rail R is lifted off of a rail plate 19 which is suitably secured beneath the track rail on the upper surface of each of the ties between which the operating unit is disposed as is illustrated in a cut-away section of the track rail and brake beams in FIG. 1. When the bearing surface 11 is elevated to this position, the car retarder can be said to be in its braking or closed position because the weight applied by a wheel W to the rail R must be supported entirely on the bearing surface 10 and 11 to thereby apply braking pressure to the rim of the wheel W by the application of the beams B to the opposite sides of the rim of the wheel W in a pincers action with the lever L2 pivoting about the journal pin 17. The amount that the rail R is raised above the rail plates 19 is dependent upon the width of the wheel W, and the wear of the brake shoes. Thus the car retarder is constructed to provide that the narrowest car wheel to be encountered and the greatest wear on the shoes will still maintain the wheel R spaced above the rail plates 19 so that full retardation will be effective.

It will be noted that because of the lever L1 being secured directly to the rail section R, wear of the outside brake shoes 20 permits the wheel W of a car to be more closely centered over the track rail R when retardation is applied. Because of allowing for wear of the outside brake shoe 20 to shift the rail section R when braking pressure is applied, it is preferable that the car retarder be constructed so that the rails R are initially on relatively wide gauge as is illustrated in FIG. 1 so that as the outside shoes 20 wear, the rails R have room to be shifted inwardly as the car axles maintain the car retarder rail sections R on proper gauge each time a car passes through the car retarder.

Figure 3:
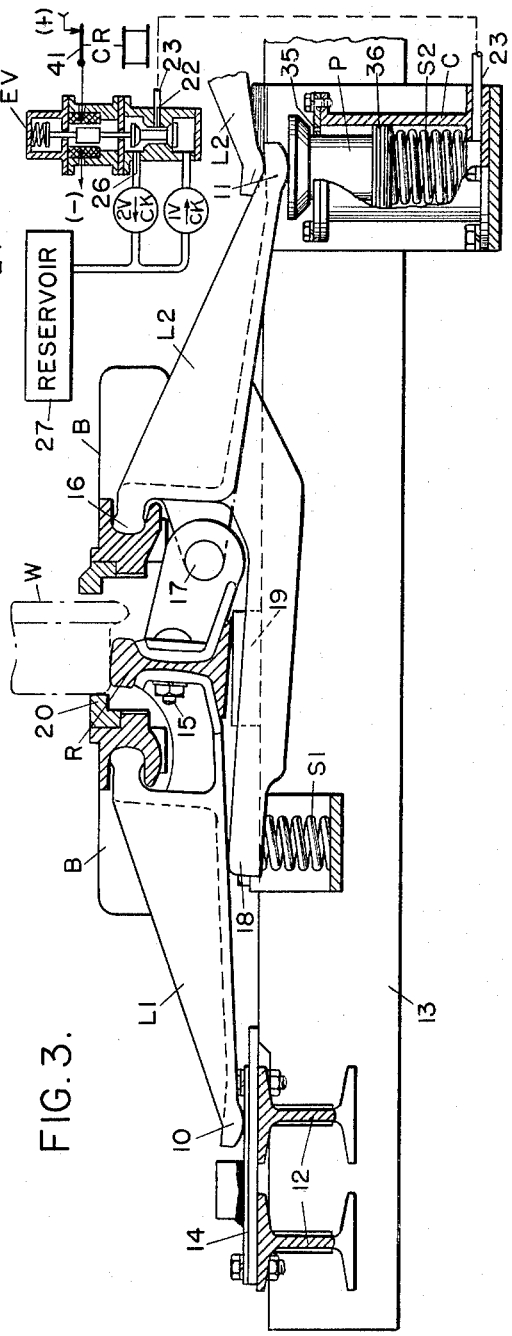
FIG. 3 is an elevational sectional view similar to FIG. 2 but illustrating the condition of the car retarder when it is locked in its open position.

A suitable amount of travel is provided for the piston P downwardly from its position with the car retarder closed so that when it is desired to open the car retarder, the piston P will compress the spring S2 to the extent illustrated in FIG. 3 wherein the rail R rests on the rail plates 19 with the shoe beams actuated far enough apart by the levers L1 and L2 to permit passage of the widest anticipated car wheel W without the wheel being wedged between the beams so as to apply braking pressure. Thus the car retarder in the position illustrated in FIG. 3 is said to be in its non-braking or open position.

Associated with each actuating unit U of FIG. 1 is an electro-hydraulic valve EV and two check valves VCK. These valves also have associated therewith a suitable fluid reservoir 27 which may if desired be common to all of the actuating units.

The valve EV is illustrated as being a solenoid actuated three-way valve, but it is to be understood that other types of valves may be employed. The valve EV illustrated in FIG. 2, for example, has a port 22 which is connected by a pipe 23 to a port 24 near the bottom of the cylinder C. Fluid may flow through this pipe 23 in either direction. With the valve EV deenergized as is illustrated in FIG. 2, fluid outlet from the cylinder C is shut off, but fluid may be drawn into cylinder C through the check valve 1VCK and through the valve ports 22 and 25. With the valve EV energized, fluid is shut off from flowing into the cylinder C through the check valve 1VCK, but it can flow out of the cylinder C, through the ports 22 and 26 in the valve EV and through the check valve 2VCK into the reservoir 27, which is illustrated in block form. It is to be understood that the reservoir may be provided with a suitable air vent and filling plug (not shown) in accordance with the requirements of practice.

With reference to FIG. 4, opening and closing treadles O–TD and C–TD are disposed near the entrance and exit ends of a typical classification track for the purpose of automatically controlling a car retarder constructed in accordance with the present invention and disposed in the classification track near the leaving end. These treadles are disposed at positions relative to the trackway whereby they are not subject to actuation by a car, but are subject to actuation by a detent or solenoid such as the solenoid CNP illustrated in FIG. 5 on a locomotive.

A car retarder control relay CR is provided for each classification track, and a suitable cancel relay CN is provided as part of the equimpent of a remotely controlled locomotive according to FIG. 5 for governing the energization of the solenoid CNP which is disposed on the locomotive so as to be operable to selectively actuate the treadles O–TD and C–TD. The remotely controlled locomotive according to FIG. 5 is illustrated by block diagram as having associated therewith communication apparatus by which it may be controlled from a remote transmitter.

To consider the mode of operation of the car retarder in accordance with the designation of open and closed positions respectively, it will be assumed that the car retarder is initially in its closed position with no car present within the car retarder. Under these conditions, each car retarder operating unit U and its control apparatus is in the condition shown in FIG. 2, this apparatus being in substantially the same condition, irrespective of whether or not the retarder is occupied by a car because of the action of the spring S1 to support the dead weight of the car retarder. With the car retarder in the braking or closed position, the piston P is fully extended upwardly from the cylinder C. It has been actuated to this position by the expansion of the spring S2. The valve EV is deenergized, thus shutting off flow of fluid out of the cylinder C by preventing flow from the port 22 to the port 26. Under these conditions the car retarder is hydraulically locked in its braking position because of hydraulic fluid being trapped within the cylinder C beneath the plunger P. The retarder is therefore maintained in this position as illustrated in FIG. 2 until actuation of the valve EV to operate the retarder to its non-braking position.

If it is now considered that the operation of the car retarder is designated, as by the actuation of the self-restoring push button O–PB of FIG. 4, the retarder control relay CR becomes picked up by the energization of an obvious circuit. When relay CR is picked up, a stick circuit is closed to maintain this relay energized extending from (+), including normally closed contact 28 of treadle C–TD, normally closed contact 29 of push button C–PB, front contact 30 of relay CR and winding of relay CR, to (−).

The picking up of relay CR energizes the valve EV upon the closure of front contact 41, and upon the energization of the valve EV, fluid is permitted to flow out of the cylinder C through the valve ports 22 and 26, through the check valve 2VCK and into the reservoir 27. It is generally desirable to have the car retarder actuated quickly and thus all of the ports involved in the flow of fluid out of the cylinder C should be relatively large to permit the cylinder to be emptied as quickly as possible. To facilitate quick operation, a vent 35 is provided at the top of the cylinder C to provide for free passage of air into the cylinder C and above piston rings 36.

If no car is present within the car retarder at the time when the valve EV becomes energized, the retarder is not opened immediately, but becomes opened as soon as sufficient weight is applied by a car wheel such as the wheel W to the retarder operating unit U to compress the spring S2. The compression of this spring S2 drops the lever L2 as fluid is forced out of the cylinder C and into the reservoir 27. When the car retarder has become fully opened, the rail R rests on the rail plates 19 as is illustrated in FIG. 3, and the piston P has compressed the spring S2 beneath it and has driven a certain amount of fluid out of the cylinder C.

Because the flow of fluid out of the cylinder C has been through the check valve 2VCK, this fluid cannot reenter the cylinder C after the car has left the retarder when the spring S2 attempts to restore the piston P to its upper position. Thus as long as the valve EV is maintained energized, the piston P is locked in its depressed position as illustrated in FIG. 3 because any attempt to expand the spring S2 is resisted by the vacuum that is formed by reason of fluid not being able to reenter the cylinder C. It will be readily apparent that the car retarder has become locked in its opened position by the above described mode of operation and will be maintained in this position, irrespective of traffic through the retarder, until the valve EV becomes deenergized. The extent to which the spring S2 is compressed is dependent upon the width of the wheel of the car. Thus when a subsequent wider wheel passes through the retarder unit, the spring is further compressed and locked in this further compressed position. Thus, when a subsequent narrower wheel enters the retarder unit, there is some space between the rim of the wheel and at least one of the brake shoes as illustrated in FIG. 3.

To consider the mode of operation in closing the retarder, it will be assumed that the closing push button C–PB of FIG. 4 is actuated. This actuation removes stick energy from the control relay CR to cause this relay to become dropped away, and the dropping away of relay CR removes energy from the valve EV by opening front contact 41 in the control circuit for this valve. Upon the deenergization of valve EV, the fluid circuit including the ports 22 and 26 is shut off, and a fluid circuit is opened connecting the ports 22 and 25 so that fluid can flow from the reservoir 27 through the check valve 1VCK, and the valve EV into the cylinder C to relieve the vacuum that has maintained the piston P in its depressed position. Thus if there is no car within the car retarder, the force of the spring S2 drives the piston P upwardly so as to raise the lever L2 to a position illustrated in FIG. 2 and thus restore the car retarder to its closed position. As the piston P is driven upwardly by the spring S2, the cylinder C becomes filled with fluid drawn through the check valve 2VCK, and it also cannot enter through the check valve 2VCK because of the ports 22 and 26 of the valve EV being closed. It will be readily apparent that if the valve EV is deenergized when its associated car retarder actuating unit U is occupied by a car wheel, the spring S2 cannot expand until the associated actuating unit has become unoccupied by the car wheel.

Manual designation has been assumed when considering the mode of operation upon opening and closing the car retarder, but it is also contemplated that automatic control may be applied to the car retarder in accordance with traffic conditions. One of these conditions may be, for example, where a remotely controlled locomotive illustrated in FIG. 5 enters a classification track 31 in a hump classification yard (see FIG. 4) at the right-hand end of the track so as to actuate the treadle O–TD by its downwardly extending solenoid plunger 32. The actuation of this treadle by traffic of the locomotive from right to left closes contact 33 to cause the picking up of relay CR. This relay when picked up is maintained energized by its stick circuit which has been described, and the car retarder is controlled to its open position in accordance with the energization of the relay as has been described. It is preferable that the contact 33 may be organized as illustrated so that it is closely only by actuation of the treadle by the remotely controlled locomotive when passing through the track 31 from right to left.

Thus the car retarder becomes opened when the locomotive enters the classification track 31 from the right-hand end, and cars can be pushed out of the classification track at the left-hand end through the open car retarder, the car retarder being opened by the weight of the car occupying the car retarder or by the first car to enter the car retarder after the control to open the car retarder has been set up. After passage of the locomotive through the car retarder in the classification track 31, its solenoid 32 actuates the treadle C–TD and opens contact 28 in the stick circuit for the relay CR so that the relay CR becomes dropped away and thus permits the immediate restoration of the car retarder to its closed position so that it is conditioned to stop the next car that may enter the classification track 31 from the hump.

If it is considered that there may be conditions under which it will not be desirable to open the car retarder upon entrance of the locomotive into the classification track 31, the solenoid plunger 32 can be retracted by the energization of the winding of the solenoid CNP when the locomotive is about to pass over the treadle O–TD. The energization of the winding of the solenoid CNP under these conditions may be accomplished in any suitable manner as by remote communication from a control office transmitter as is illustrated in FIG. 5. Thus, according to FIG. 5, a push button CNPB is provided at a control office, and the actuation of this push button to its depressed position is effective to transmit a control to a receiver on the locomotive which energizes the relay CN and closes front contact 34 so as to energize the solenoid CNP and retract its plunger so as to clear the treadles.

Although the description has been directed particularly to the operation of a typical actuating unit of the car retarder associated with one of the track rails, it will be readily apparent that a similar mode of operation is provided for a corresponding unit associated with the other track rail, the same piston P, cylinder C and spring S2 assembly being used for controlling both actuating units. Thus the inside levers L2 of both units rest on the same piston P.

Although only a double rail retarder is illustrated, it is to be understood that because of the operating units associated with the respective track rails being substantially independent of each other, the structure as described can be used in association with only a single track rail where single rail retarders can provide sufficient braking to satisfy the requirements of practice.

A modified form of the car retarder control system is shown in FIG. 6 wherein a seal around the piston P is maintained by the rings 37. Rather than vent the upper section of the cylinder C1, the fluid is circulated from the lower section of cylinder C1 to the upper section upon opening the retarder, and the fluid is circulated in the opposite direction upon closing the car retarder. This organization has the advantage that the car retarder is locked in its open position by fluid trapped in the cylinder C1 above the rings 36, thus holding the spring S2 compressed by fluid pressure rather than holding it compressed dependent upon a vacuum formed beneath the piston P as is the case in the system according to FIG. 3.

To consider the organization according to FIG. 6 more specifically, it will be noted that the fluid reservoir is connected into the valve EV1 through a port 38 at a point in the valve where fluid is never under pressure. Thus the reservoir carries a supply of fluid to make up for losses in the system and also provides storage for any surplus amount of fluid there may be at different stages in the operation of the piston P to open the retarder.

It will be noted that the port 39 at the top of the cylinder C1 is connected to both the check valves 1VCK and 2VCK which are disposed in pipes connected to the valve EV1 the same as has been described in detail relative to the use of the check valves with the system according to FIG. 2.

The mode of operation of the system according to FIG. 6 is similar to the mode of operation that has been described relative to FIG. 2 in operating the car retarder from its closed to its open position in that fluid flows through the valve EV1 and through the check valve 1VCK. This fluid, according to FIG. 6, however, is drawn through the port 39 into the upper portion of the cylinder C1 as the piston P is actuated downwardly and the spring S2 becomes compressed. Any surplus amount of fluid that accumulates during this operation flows into the reservoir.

The operation of the car retarder to its closed position in the organization according to FIG. 6 is effective upon the deenergization of the valve EV1 wherein the expansion of the spring S2 drives the piston P upwardly, forcing fluid out of the port 39 in the cylinder C1 and through the check valve 2VCK into the lower section of the cylinder. If more fluid is required below the piston P than was in the cylinder C1 above the piston P, fluid is drawn from the reservoir through the check valves 1VCK and 2VCK in series.

Figure 7:
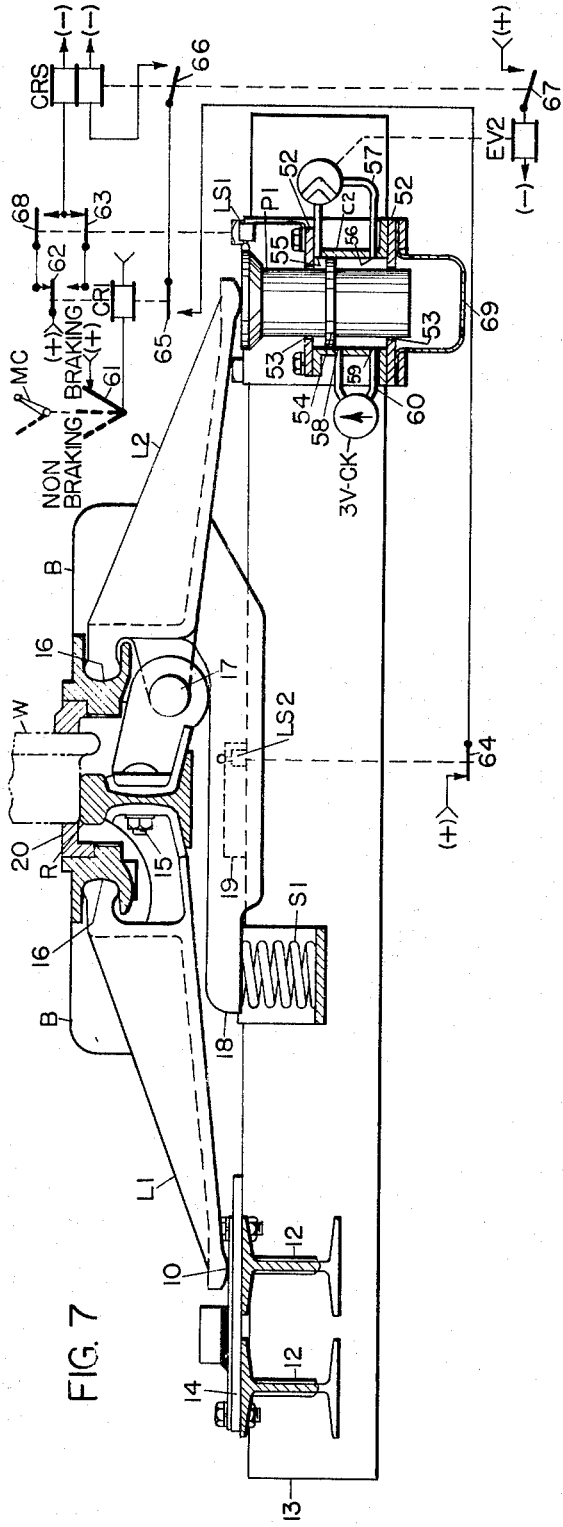
FIG. 7 illustrates another embodiment of the present invention wherein a car retarder of the inert type is shown in its braking position and it has associated therewith hydraulic locking means governed by a two-way control valve.
Figure 8:
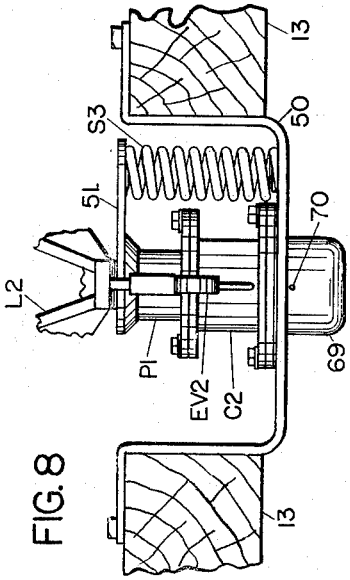
FIG. 8 is a partial end view of the car retarder operating and locking means shown in FIG. 7.
Figure 9:
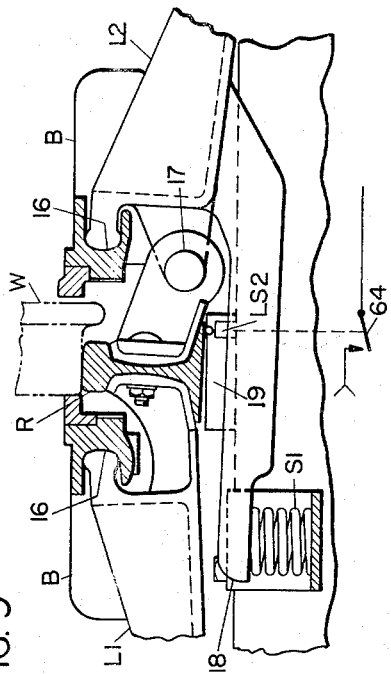
FIG. 9 is a partial view of the inert car retarder of FIG. 7 in its non-braking position.

With reference to FIGS. 7, 8, and 9, another embodiment of the present invention is illustrated which provides for quick operation of the retarder to its non-braking position. This embodiment also provides a simplified hydraulic locking means requiring only a single normally deenergized two-way hydraulic valve EV2 to selectively render the locking effective.

The general structure of the retarder according to FIGS. 7, 8, and 9 is the same as that which has been heretofore described. Thus it is to be understood that the description of the structure of the car retarder as has been set forth is applicable to FIGS. 7, 8, and 9, similar reference characters being used for corresponding parts.

The car retarder operating means of FIGS. 7, 8, and 9 differs, however, in that the spring power for operation of the retarder to a braking position is provided by a compression spring S3 (see FIG. 8) which is disposed on a yoke 50 connecting laterly disposed ties 13. The yoke also supports an elevationally disposed cylinder C2 containing a piston P1, the top of which serves as a support point for the car retarder lever L2. Thus, the operation of the piston longitudinally within the cylinder C2 is effective to selectively raise or lower the lever L2 and operate the car retarder selectively between braking and non-braking positions. The braking position is fully obtained when the piston P1 is raised to the position shown in FIG. 7, and the car retarder is operated to its non-braking position when the piston P1 is operated downwardly so as to drop the lever C2 to a position where the track rail R rests on the plate 19 (see FIG. 9).

With reference to FIG. 8, the top of the piston P1 is formed with an extending arm 51 normal to the axis of the piston P1. The spring S3 is compressed between the base of the yoke 50 and the underside of the arm 51, and thus provides spring pressure for actuating both the piston and the lever L2 to upward positions for operating the car retarder to its braking position as is shown in FIG. 7. As has been pointed out heretofore relative to the spring S2, the spring S3 has sufficient spring pressure to operate the retarder to a braking position when no car is present within the retarder. It is yieldable to the weight of a car, when rendered effective, to permit the actuation of the lever L2 and the piston P1 downwardly to a position to permit the rail R to rest on the plate 19 (see FIG. 9) for operation of the car retarder to a non-braking position. Although the spring S3 is shown as acting upon an extension from the top of the piston P1, it is to be understood that the spring S3 may be otherwise disposed in accordance with requirements of practice as long as it is effective to raise the lever L2 and the piston P1, with no car present within the retarder, to operate the retarder to its braking position, and as long as the spring S3 may be compressed by the weight of the car on the retarder to operate the retarder to its non-braking position.

The piston P1 differs from the piston P heretofore described in that it is longer and extends through both ends of the cylinder C2. Bearing plates 52 are provided at both the top and bottom ends of the cylinder C2. The bearing plates 52 are provided with a suitable seal 53 to prevent leakage of fluid out of the cylinder C2. The piston P1 carries piston rings 54 which provide a seal to retain the piston P1 in its upper or lower actuated position when fluid is locked within the cylinder C2.

Openings 55 and 56 are provided at the upper and lower ends respectively of the cylinder C2 to permit the flow of fluid into and out of the cylinder C2. These openings 55 and 56 are connected by a fluid line 57 containing an electrical hydraulic two-way valve EV2. This valve is normally closed, and when closed the piston P1 is retained in its actuated position because of fluid being locked within the cylinder C2.

In addition to the fluid circulating system that has been described, another fluid circulating system is provided including openings 58 and 59 at intermediate and lower positions in the cylinder C2 respectively which are connected by a fluid line containing a check valve 3V-CK, which permits fluid to flow only out of the opening 59 in the cylinder C2. It is thus provided that upon operation of the car retarder to its non-braking position, fluid starts to flow through the fluid line 60 when the rings 54 of the piston P1 have been operated below the opening 58 in the cylinder C2. This is accomplished shortly after the start of the operation of the retarder to a non-braking position, and the flow of fluid in the line 60 accelerates the operation by permitting fluid to flow relatively rapidly in both lines 57 and 60 to permit the lever L2 to be lowered relatively rapidly.

It will readily be understood from the description that has been set forth that the energization of the valve EV2 to permit circulation of the fluid from one end of the cylinder C2 to the other is required in order to permit operation of the car retarder from one position to another. Although it will be readily apparent that different circuit means may be required according to practice for the control of the retarder, a simplified circuit control system is illustrated in FIG. 7 wherein a control stick relay CRS is provided for the control of the valve EV2 directly, and the relay CRS is operated by a control relay CR1 which may be either remotely controlled or controlled by the manual control switch MC as illustrated in FIG. 7. The control switch MC is a two-position switch which can be operated to its righthand position for the operation of the retarder to a braking position, and to its lefthand position for operation of the retarder to its non-braking position.

The retarder is shown in FIG. 7 in its braking position, and thus the control switch MC is operated to the right, and the relay CR1 is in its energized position because of the closure of contact 61 of this control switch. Limit switches LS1 and LS2 are provided for use in the control of the locking mechanism. The limit switch LS1 is disposed near the top of the piston P1 so as to be actuated when the car retarder is fully operated to its braking position. The limit switch LS2 is disposed beneath the track rail so as to be operated when the retarder approaches operation to its non-braking position. The limit switch LS2 is normally closed, and it is operated just prior to the lowering of the track rail R onto the plate 19.

Because the limit switch LS1 is in its actuated position by reason of the car retarder being in its braking position as illustrated in FIG. 7, and because of the manual control switch MC being in a corresponding braking position, the control stick relay CRS is deenergized and thus the valve EV2 is deenergized and is closed. This locks the fluid in the lower section of the cylinder C2 and therefore retains the piston P1 in its elevationally operated position.

To consider the mode of operation for operating the car retarder to its non-braking position, it will be assumed that the lever MC is operated to the lefthand position, thus opening the contact 61 and causing the dropping away of the relay CR1. This operation closes a pick-up circuit for the relay CRS extending from (+), including back contact 62 of relay CR1, front contact 63 of limit switch LS1 and winding of relay CRS, to (−). This relay is maintained energized by a stick circuit including front contact 64 of limit switch LS2, back contact 65 of control relay CR1 and front contact 66 of relay CRS. When relay CRS is picked up, an obvious energizing circuit is closed for valve EV2 at front contact 67. The energization of valve EV2 permits the flow of fluid from the lower section of the cylinder C2 to the upper section and thus permits the dropping of the piston P1 and the operation of the car retarder toward its non-braking position. The dropping of the piston P1 permits flow of fluid through the check valve 3V-CK, and thus the operation of the retarder is accelerated.

When the limit switch LS2 becomes actuated as the car retarder approaches its non-braking position, the stick circuit for relay CRS is opened at front contact 64, and thus this relay is dropped away and the valve EV2 becomes closed. When this takes place, the only fluid circulating line left open is the line through the check valve 3V-CK, and thus the rate of operation of the retarder is decreased so that a cushioning effect is provided for the point at which the rail R drops onto the supporting plate 19 to complete the operation of the retarder to its non-braking position.

Inasmuch as the extent to which the piston P1 is operated downwardly is dependent upon the width of the car wheel W within the retarder, it is provided by the check valve 3V-CK, that should wider wheels pass through the retarder, the piston P1 may be dropped still further by the weight of the car as fluid is permitted to flow through the check valve 3V-CK, even though the valve EV2 is closed. In other words even after the valve EV2 is closed to lock the retarder in its non-braking position by preventing the flow of fluid out of the upper portion of the cylinder C2, fluid is permitted to flow through the check valve 3V-CK to permit operation of the piston P1 further as may be required for wider car wheels.

For operation of the car retarder from a non-braking position to a braking position, the lever MC is operated to its righthand position to provide for the picking up of relay CR1, and the picking up of relay CR1 closes a pickup circuit for the relay CRS including front contact 62 of relay CR1 and back contact 68 of limit switch LS1. The energization of relay CRS provides for the energization of valve EV2, which permits fluid to flow from the upper section of the cylinder C2 to the lower section and thus permits the spring S3 to operate the retarder to its braking position by raising the lever L2 along with the piston P1. When the piston P1 reaches its fully elevated position, the limit switch LS1 becomes actuated to open back contact 68 and cause the dropping away of relay CRS, which in turn deenergizes the valve EV2 and locks fluid in the lower portion of the cylinder C2 to maintain the car retarder in its braking position.

One reason the piston P1 has been made to extend through the lower portion of the cylinder C2 is to simplify the fluid locking system so as to provide that the fluid leaving one end of the cylinder C2 may be fed into the other end without the use of accumulators, reservoirs and the like for storage of excess fluid. It is to be understood however that such system may be employed in accordance with the requirements of practice. A cover 69 is illustrated as being provided for the lower end of the piston P1, this cover being provided with a suitable vent 70 so that air may enter and leave the cover 69 as the piston P1 is operated longitudinally within the cylinder C2.

Having thus described specific embodiments of a car retarding system for railroads, it is to be understood that the present invention is not limited to the specific forms shown, and that various adaptations, alterations and modifications may be applied to the specific form shown to meet the requirements of practice except as limited by the scope of the following claims.

What I claim is:
1. A car retarding system comprising:
   (a) a stretch of railway track including a car retarder of the track brake type having respective braking and non-braking positions,
   (b) retarder operating means powered by at least one compression spring for operating said car retarder from said non-braking position to said braking position when no car is present within the retarder,
   (c) said spring being subject to compression by the weight of the car in the retarder for operating said retarder from said braking position to said non-braking position, and
   (d) said operating means being ineffective to lock the retarder in either of said positions, and
   (e) locking means for selectively rendering said operating means effective or ineffective, and
   (f) said locking means being ineffective to operate said retarder to either of said positions.

2. A car retarding system according to claim 1 wherein said locking means comprises hydraulic means having a piston adapted to selectively restrict movement of a portion of the retarder, said piston being disposed within a hydraulic cylinder and at least one valve being provided for selectively locking fluid within the cylinder for restricting movement of the piston.

3. A car retarding system comprising:
   (a) a car retarder of the track brake type disposed in a stretch of railway track having respective braking and non-braking positions,
   (b) opening means including at least one spring providing power solely by spring pressure for actuating said car retarder to a braking position when no car is present within the retarder,
   (c) said spring pressure being subject to compression by the weight of a car in the retarder to operate said retarder from said braking position to said non-braking position, and
   (d) said operating means being ineffective to lock the retarder in either of said positions, and
   (e) locking means selectively controlled to render said operating means ineffective at least for actuating the retarder from said braking position to said non-braking position,
   (f) said locking means being ineffective to operate said retarder to either of said positions.

4. A car retarding system according to claim 3 wherein the locking means comprises a hydraulic system for selectively rendering said operating means ineffective for actuating the retarder from said non-braking position to said braking position.

5. A car retarding system comprising:
   (a) a stretch of railway track including a car retarder of the track brake type having respective braking and non-braking positions,
   (b) retarder operating means powered by at least one compression spring for actuating said car retarder from said non-braking position to said braking position when no car is present within the retarder,
   (c) said spring being subject to compression by the weight of a car in the retarder for operating said retarder from said braking position to said non-braking position, and
   (d) said operating means being ineffective to lock the retarder in either of said positions, and
   (e) hydraulic locking means for selectively rendering said retarder operating means inoperative,
   (f) said hydraulic means including a piston supporting a part of the retarder and disposed within a hydraulic cylinder, and
   (g) said locking means being ineffective to operate said retarder to either of said positions,
   (h) and means for selectively permitting the flow of fluid from one side of the piston to the other.

6. A car retarding system comprising:
   (a) a stretch of railway track including a car retarder of the track braking type having respective braking and non-braking positions,
   (b) retarder operating means powered by at least one compression spring for operating said car retarder from said non-braking position to said braking position,
   (c) said spring being subject to compression by the weight of the car in the retarder to operate the retarder from said braking position to said non-braking position, and
   (d) said operating means being ineffective to lock the retarder in either of said positions, and
   (e) hydraulic locking means including a piston adapted to restrict movement of a portion of the retarder said piston being disposed within a cylinder for selectively rendering said retarder operating means effective or ineffective,
   (f) said locking means being ineffective to operate said retarder to either of said positions, and
   (g) said hydraulic locking means including a plurality of fluid conducting means for selectively conducting fluid from one side of said piston within said cylinder to the other side of said piston at respectively different stages in movement longitudinally of the piston in the cylinder, wherein said operating means is permitted to operate at different rates for different positions of the piston in the cylinder.

7. A car retarding system according to claim 6 wherein one of said fluid conducting means includes a check valve for permitting passage of fluid only upon the operation of said retarder to said non-braking position.

8. A car retarding system comprising:
   (a) a stretch of railway track including a car retarder secured to at least one track rail,
   (b) said car retarder having a braking position in which braking pressure is applied to the sides of car wheels by the weight of the car on the track rail,
   (c) said car retarder having a non-braking position in which the weight of the car on the track rail is ineffective to apply braking pressure to the sides of the car wheels,
   (d) retarder operating means powered by at least one compression spring when rendered effective for operating said car retarder from said non-braking position to said braking position when no car is present within the retarder,
   (e) said spring being subject to compression by the weight of the car on the track rail when rendered effective for operating said retarder from said braking position to said non-braking position, and
(f) said operating means being ineffective to lock the retarder in either of said positions, and
(g) locking means for selectively rendering said operating means effective or ineffective,
(h) said locking means being ineffective to operate said retarder to either of said positions.

9. A car retarding system according to claim 8 wherein said locking means includes hydraulic means governing the rate of operation of said operating means for permitting said retarder operating means to operate said retarder from said braking position to said non-braking position at a relatively high speed until operation is nearly completed, and limiting means is provided to reduce the speed of operation of the retarder operating means just prior to the completion of operation to said non-braking position.

10. A car retarding system according to claim 9 wherein said limiting means includes a limit switch actuated when the operation of the retarder approaches its non-braking position for reducing the speed of operation of the operating means.

References Cited by the Examiner
UNITED STATES PATENTS

| | | | |
|---|---|---|---|
| 2,299,476 | 10/42 | Farmer | 303—18 |
| 2,630,884 | 3/53 | Bone | 188—62 |
| 2,633,210 | 3/53 | Beltman | 188—62 |
| 2,858,907 | 11/58 | Brown | 188—62 |

ARTHUR L. LA POINT, *Primary Examiner.*

A. JOSEPH GOLDBERG, DUANE A. REGER,
*Examiners.*